United States Patent [19]

Berger

[11] Patent Number: 5,104,080

[45] Date of Patent: Apr. 14, 1992

[54] SLIDABLE SHELF FOR OUTDOOR GRILLS

[75] Inventor: Bernard B. Berger, Aiken, S.C.

[73] Assignee: The Ducane Company, Inc., Columbia, S.C.

[21] Appl. No.: 641,008

[22] Filed: Jan. 14, 1991

[51] Int. Cl.⁵ ............................................. A47G 29/02
[52] U.S. Cl. .................................. 248/250; 108/152; 126/25 R; 211/90
[58] Field of Search ............... 248/214, 215, 235, 247, 248/248; 211/90, 153, 135; 108/152, 159, 143; 126/25 R, 9 R

[56] References Cited

U.S. PATENT DOCUMENTS

| 973,674 | 10/1910 | Lilley | 248/248 |
|---|---|---|---|
| 2,601,888 | 7/1952 | Schopper | 248/214 |
| 2,743,023 | 4/1956 | Larson | 248/215 |
| 2,768,042 | 10/1956 | Persinger | 126/25 R |
| 3,017,155 | 1/1962 | Scarpetti . | |
| 3,196,812 | 7/1965 | Jacques | 108/152 |
| 3,223,370 | 12/1965 | Pignon . | |
| 3,391,682 | 7/1968 | King . | |
| 3,966,056 | 6/1976 | Larson | 248/247 X |
| 4,331,123 | 5/1982 | Alles | 126/9 R |
| 4,688,541 | 8/1987 | Stephen | 126/25 R |
| 4,702,224 | 10/1987 | Griffith . | |
| 4,762,114 | 8/1988 | Blankemeyer . | |
| 4,871,136 | 10/1989 | Bessinger | 211/90 X |
| 4,886,045 | 12/1989 | Ducate . | |
| 4,949,924 | 8/1990 | Carmody | 248/215 |
| 4,995,524 | 2/1991 | Welles | 248/346.1 X |

Primary Examiner—J. Franklin Foss
Attorney, Agent, or Firm—Pollock, Vande Sande & Priddy

[57] ABSTRACT

A work counter assembly for outdoor grills comprising a pair of spaced-apart brackets for securing the assembly to a grill, a work counter support member extending between the brackets and provided with U-shaped lip segments along inner and outer edge portions, and a work shelf slidably fitted between and engaged by the U-shaped lip segments to retain the work shelf on the support member.

25 Claims, 3 Drawing Sheets

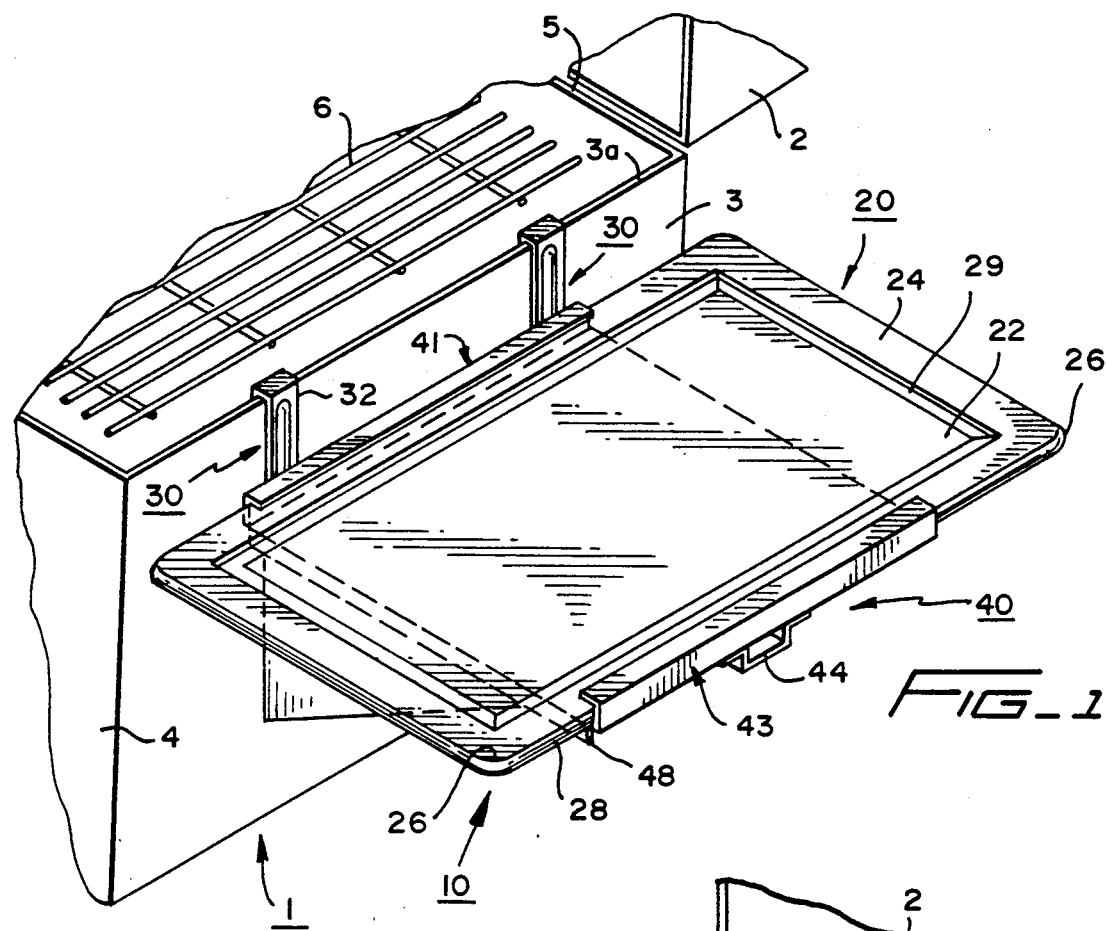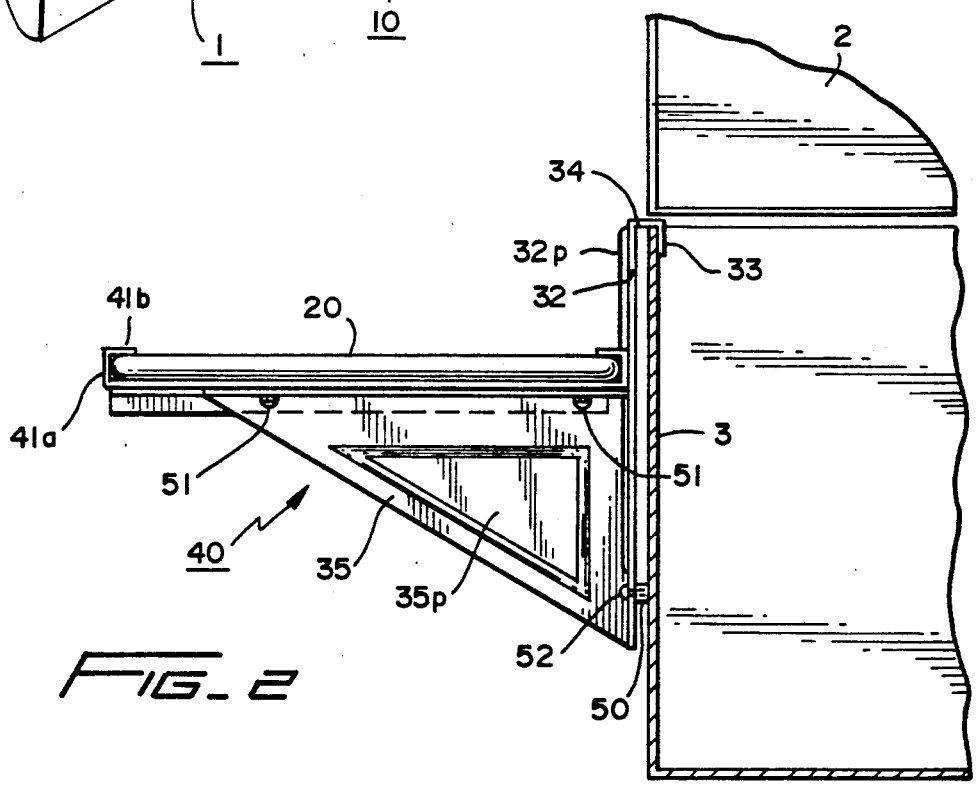

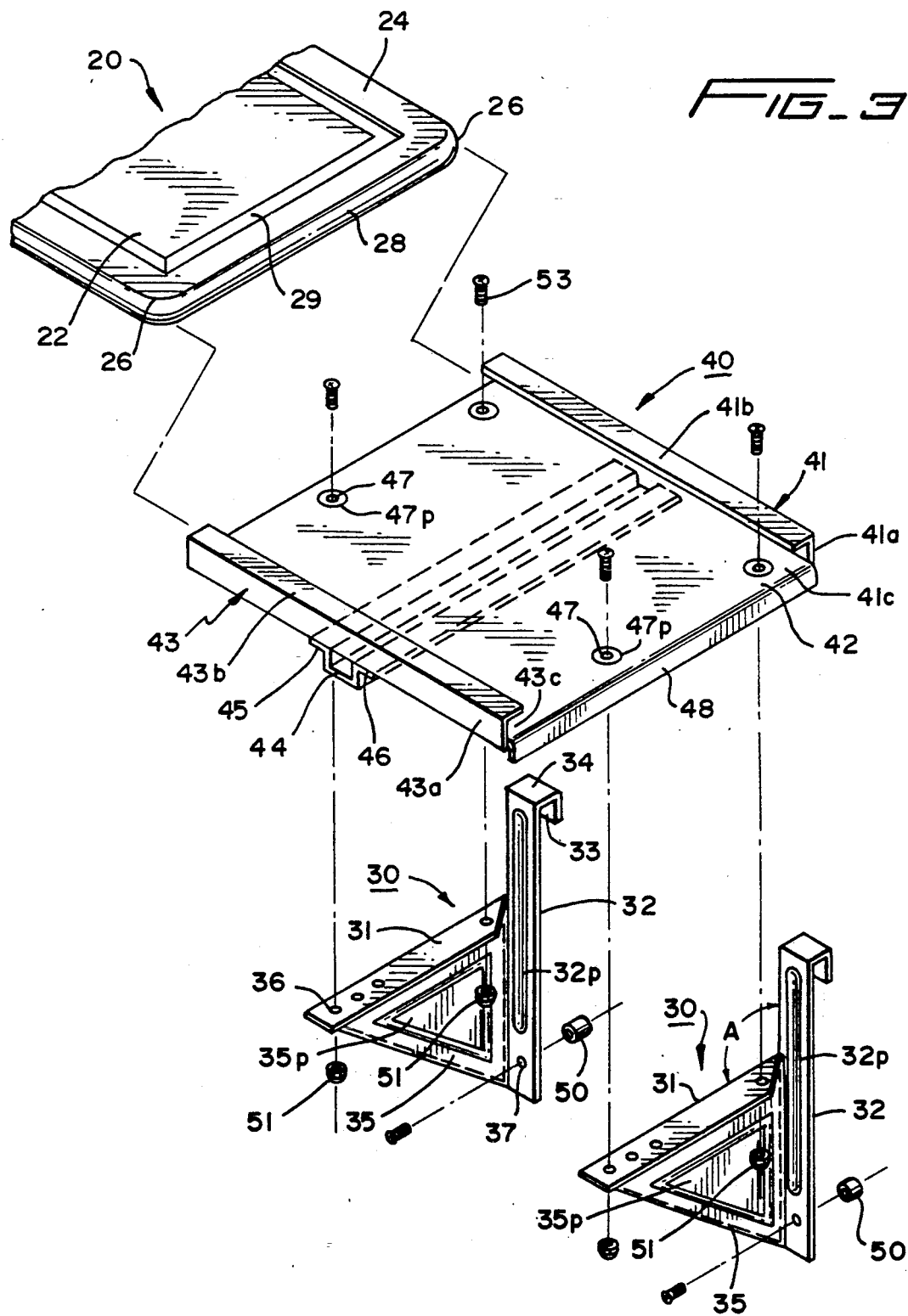

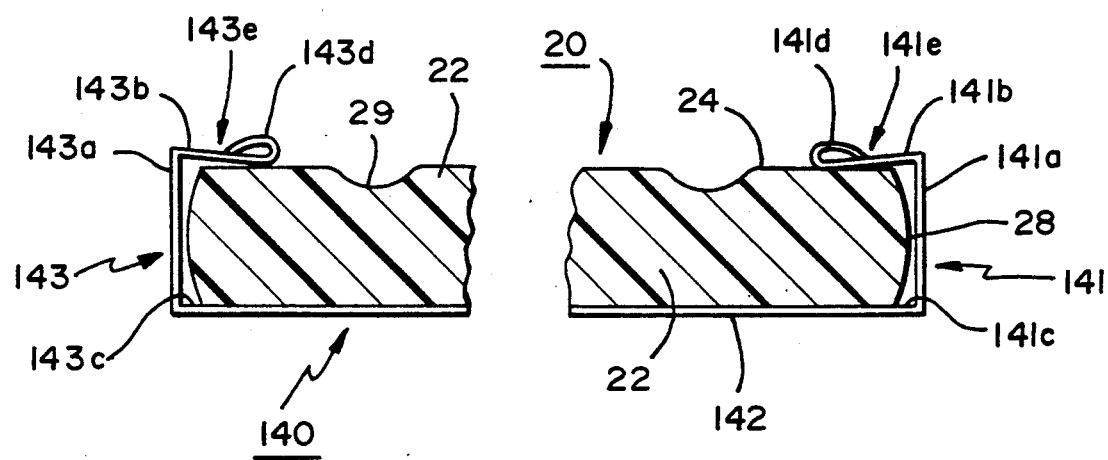
FIG_4

SLIDABLE SHELF FOR OUTDOOR GRILLS

TECHNICAL FIELD

The present invention relates to outdoor cooking grills such as barbecue grills, and more particularly to work counters for outdoor cooking grills.

BACKGROUND OF THE INVENTION

A work counter is a useful accessory for an outdoor grill, and some grills have a work counter as part of their basic structure. See for example U.S. Pat. No. 4,886,045 to Ducate, Jr., et.al., for a gas-fired outdoor grill having a work counter which is secured to one side of the grill by hinges to permit the work counter to be folded into a vertical position. On the other hand, many grills on the market are not furnished with a work counter and must be used with a separate work counter. However, it is desirable to have the work counter attached to the grill for use, but easily removable from the grill for cleaning. Although the prior art describes removable work counters for outdoor grills, there is a need for an improved assembly for removable work counters.

SUMMARY OF THE INVENTION

A principal object of the present invention is to provide an improved work counter assembly in the form of a detachable shelf for outdoor grills such as gas-fired barbecue grills. Other objects and advantages of the invention will be apparent from the following description and the appended claims.

In accordance with the present invention, there is provided a work counter assembly for an outdoor grill in which the grill comprises a housing which encloses a cooking zone and includes an upstanding wall having a rim and a vertically extending, generally planar outer surface. The work counter assembly includes at least two spaced-apart, vertically extending brackets for attaching the work counter assembly to the upstanding wall of the grill, a horizontally extending work counter support member extending between the two brackets and projecting laterally outward from the grill housing for supporting a work counter shelf, and a work counter shelf which is slidably mounted in the work counter support member.

Each bracket includes a generally vertical elongated portion for removably attaching the bracket to the upstanding wall of the grill, and a generally horizontal elongated portion secured both to the vertical portion of the bracket and to a horizontal portion of the work counter support member. The work counter support member extends generally horizontally between and is attached to the horizontally-extending portions of the brackets. The generally horizontal work counter support member includes inner and outer U-shaped edge portions, each of which is bent back toward the other to provide opposing lip segments for slidably engaging inner and outer border portions of the work counter shelf.

The invention provides a work counter assembly which is easily attachable to and detachable from an outdoor grill, yet is securely held in place on the grill during use. The work counter shelf itself can easily be removed separately for cleaning while leaving the rest of the assembly in place on the grill, yet it cannot accidentally be knocked off of the support member. On the other hand, the entire assembly can easily be detached from the grill for storage and/or cleaning. This invention also provides a work counter assembly which may be used with a wide variety of either portable or non-portable outdoor grills.

BRIEF DESCRIPTION OF THE DRAWINGS

FIG. 1 is a perspective view of the work counter assembly of the present invention mounted on an outdoor grill.

FIG. 2 is an end view in elevation of the work counter assembly of the present invention mounted on an outdoor grill.

FIG. 3 is an exploded perspective view of the work counter assembly of the present invention.

FIG. 4 is a fragmentary end view in section showing portions of the work counter shelf and a modification of the opposing lip segments for holding the shelf in place.

DETAILED DESCRIPTION OF THE INVENTION

Referring to FIG. 1 of the drawings, a work counter assembly, generally designated 10, is shown supported on an outdoor grill 1. The outdoor grill itself is not a part of the present invention and portions thereof are shown only to illustrate the use of the work counter assembly with the grill. Outdoor grill 1 has a cooking grill element 6 mounted within a cooking zone which is bounded by a sidewall 3, a front wall 4, a back wall 5, and a cover 2.

Work counter assembly 10 comprises a work counter shelf 20, a work counter support member 40 supporting work counter shelf 20, and a pair of brackets 30,30 for detachably securing the work counter assembly to sidewall 3 of outdoor grill 1.

Work shelf 20 is dimensioned to fit snugly between plate edge portions 41,43, and comprises a work surface 22 and a border 24. In a preferred embodiment, side edges 28 of shelf 20 are convex and corners 26 are rounded to facilitate sliding insertion of the work shelf 20 into work counter support 40. Work shelf 20 is preferably provided with an annular groove 29 between work surface 22 and border 24 for receiving hot grease, juices and other liquids which may drain away from food placed on work surface 22.

Referring now to FIGS. 2 and 3 of the drawings, each of the brackets 30,30 comprises a generally horizontal elongated planar arm portion 31, a generally vertical elongated planar leg portion 32 and a triangular brace portion 35. One edge of brace portion 35 is secured to an edge of vertical leg portion 32 and another edge of brace portion 35 is secured to an edge of horizontal arm portion 31. Vertical leg portion 32 of bracket 30 is provided near its upper end with a downwardly facing U-shaped segment comprising a horizontal segment 34 and a downwardly depending segment 33 to form a hanger portion for fitting over a rim 3a along the upper edge of upstanding sidewall 3 of outdoor grill 1. The lower portion of vertical portion 32 is held in spaced relation to sidewall 3 by a stop element 50 secured to portion 32 with a bolt 52 which is threaded into the stop element.

Each of the substantially planar elongated portions 31,32 and the substantially planar triangular brace portions 35,35 of brackets 30,30 can readily be fabricated as a single piece of bent sheet metal using conventional metal-forming techniques to produce a bracket without welding or other joining steps. Each leg portion 32 of brackets 30,30 may be provided with a transversely stamped elongated protuberance 32p to increase the strength of these sheet metal components for bending and torsional loads. The strength of sheet metal arm portions 31,31 for bending and torsional loads is provided by a substantially 90° bend between each arm portion and the corresponding brace portion 35. Similar to leg portions 32,32, the strength of brace portions 35,35 for bending and torsional loads is increased by corresponding transversely stamped triangular protuberances 35p, 35p.

Preferably, the arm portions 31 and the leg portions 32 of brackets 30,30 are perpendicular to each other so that the angle A shown in FIG. 3 is a right angle (90°) when grill sidewall 3 is substantially vertical. For use with outdoor grills in which sidewall 3 slants inwardly in a downward direction, angle A is preferably an acute angle sufficiently less than 90° by an amount corresponding to the departure of sidewall 3 from the vertical, such that bracket arm portion 31 is substantially horizontal when the bracket 30 is mounted on sidewall 3. As an alternative to making "A" an acute angle, spacer 50 may be lengthened to compensate for a departure from the vertical of sidewall 3 such that leg portion 32 remains substantially vertical even though sidewall 3 is slanted.

Work counter support member 40 comprises a generally planar plate portion 42, an inner edge portion 41 having a vertical wall segment member 41a and an inwardly extending lip segment 41b, and an outer edge portion 43 having a vertical wall segment 43a and an inwardly extending lip segment 43b. Overlying lip segments 41b and 43b prevent work shelf 20 from being accidentally dislodged, and the thickness of shelf border 24 is dimensioned to fit snugly between overlying lip segments 41b and 43b and underlying plate edge segments 41c and 43c, respectively. A U-shaped reinforcing channel 44 is fixed by rivets, welds, bolts or the like to the lower surface of plate portion 42 by flanges 45,46 to provide additional rigidity to work counter support member 40. The rigidity of plate portion 42 may be further increased by bending down an extension thereof at each end of plate portion 42 to form a pair of depending wall segments 48,48, one of which is shown in FIG. 1 and the other of which is shown in FIG. 3.

Work counter support member 40 is secured to brackets 30,30 by bolts 53 which extend through apertures 47 in plate portion 42 and mating holes 36 in horizontal arm portions 31,31 and are screwed into corresponding nuts 51. Apertures 47 are preferably countersunk by stamped protuberances 47p which protrude transversely from the lower surface of plate portion 42.

In a preferred embodiment of the present invention, resilient retaining means is provided for frictionally engaging border 24 to positively clamp work shelf 20 in work counter support 40. In one such embodiment as shown in FIG. 4, the resilient retaining means comprises inner and outer edge portions 141 and 143 of a work counter support, generally designated 140. Vertical sidewall members 141a and 143a extend above the plane of the upper surface of border 24 of shelf 20, and inwardly extending lip segments 141b and 143b are angled slightly downward to provide a spring force for resiliently pressing against and frictionally engaging the upper surface of border 24, which is thereby clamped lightly but firmly between the overlying lip segments and the underlying plate edge segments 141c and 143c of plate member 142.

The distal edges 141d and 143d of lip segments 141b and 143b are preferably curled back as shown in FIG. 4 to provide a contact surface which will not gouge the work shelf 20. The curled edges 141d and 143d also provide an intermediate line of contact at 141e and 143e, respectively, to stiffen the lip segments 141b and 143b, and thereby increase the spring force provided when the latter are moved from their rest positions by sliding insertion of shelf 20 in support 140. In a more preferred embodiment, at least the upper surface of shelf border 24 is roughened to increased the friction between this surface and the underside of lip segments 141b and 143b. The underside of shelf 20 also may be roughened to increase the frictional engagement with the upper surface of plate member 142.

The material from which the work shelf is made is not critical and materials such as wood or plastic, which are conventionally used for food counters, may be used. The preferred materials are those which do not absorb moisture or retain odors and the most preferred material is high density polyethylene. As previously indicated, the groove 29 in work surface 22 is provided for catching juice from meat or other food placed on work shelf 20.

The drawings and the foregoing description are intended to illustrate and not to limit the invention. Workers in the art will readily be able to make changes therein without departing from the invention. For example, while the brackets are shown as having integral vertical and horizontal members formed from a single piece of sheet metal, the brackets also could comprise separately formed portions which are welded or bolted together and could be made from bar stock as well as from sheet metal.

What is claimed is:

1. A work counter assembly for an outdoor grill having a housing which encloses a cooking zone and includes an upstanding wall having a rim and a vertically extending outer surface, said work counter assembly comprising:

a work counter support member having a generally horizontal base portion connecting inner and outer U-shaped edge portions inwardly facing each other in opposed relation;

a work shelf member supported by said support member, said shelf member having a working surface for supporting food and the like and border portions on opposite sides of said working surface for being slidably received by the inwardly facing U-shaped edge portions of said support member; and, means for mounting said support member on the upstanding wall of said grill housing, each of said U-shaped edge portions comprising an inwardly extending lip segment for overlying a corresponding one of said border portions to prevent said shelf member from being separated from said support member in a generally vertical direction, said mounting means comprising at least two spaced-apart bracket members each having a vertically extending elongated portion for resting adjacent to said outer surface of the upstanding housing wall, and a horizontally extending elongated portion attached to said vertical portion for engaging said support member, and said mounting means further comprising suspending means for extending over and engaging the rim of said upstanding wall to detachably suspend said vertically extending bracket portions from said rim.

2. A work counter assembly according to claim 1 wherein said inwardly facing edge portions further comprise means for causing said inwardly extending lip segments to resiliently engage the border portions of said shelf member and thereby provide a clamping action for frictionally retaining said work shelf within said support member.

3. A work counter assembly according to claim 2 wherein each of said lip segments includes a distal edge portion which is curled back into contact with an intermediate portion of the lip segment so as to stiffen the lip segment and thereby increase said clamping action.

4. A work counter assembly according to claim 2 wherein each of the border portions of said work shelf member has a roughened surface for increasing the frictional engagement provided by the clamping action of said lip segments.

5. A work counter assembly according to claim 1 wherein said vertically extending bracket portions are made of sheet metal and comprise a laterally projecting and longitudinally extending protuberance to increase the strength of said sheet metal for bending and torsional loads.

6. A work counter assembly according to claim 1 wherein each of said bracket members is formed of a single piece of sheet metal bent to form said vertically extending and said horizontally extending elongated portions.

7. A work counter assembly according to claim 1 wherein each of said bracket members further comprises a triangular brace portion connecting a longitudinal extent of said vertically extending portion to a longitudinal extent of said horizontally extending portion.

8. A work counter assembly according to claim 1 wherein the vertically extending portion of each of said bracket members has a substantially planar surface for extending opposite to the outer surface of said upstanding wall of the grill housing.

9. A work counter assembly according to claim 1 wherein said suspending means comprises a downwardly facing U-shaped end segment at one end of each of said vertically extending bracket portions, said U-shaped end segment being shaped to be hooked over the rim o said upstanding housing wall.

10. A work counter assembly according to claim 9 wherein said mounting means further comprises spacer means connected to each of said vertically extending bracket portions to position another end thereof in spaced relation to the outer surface of said upstanding wall of the grill housing.

11. A work counter assembly according to claim 1 wherein said work counter support member is made from a single piece of sheet metal bent to form the base portion and the inner and outer edge portions thereof.

12. A work counter assembly according to claim 1 wherein said base portion of the support member is made of sheet metal and has front and rear end segments extending transversely to said inner and outer edge portions, and each of said end segments is bent out of the plane of a plate portion to increase the strength of said plate portion for bending and torsional loads.

13. A work counter assembly according to claim 1 wherein the base portion of said work counter support member is made of sheet metal, and wherein said support member further comprises an elongated stiffening member fixed to the bottom surface of said base portion, said stiffening member having a U-shaped transverse cross section and extending longitudinally substantially perpendicular to said inner and outer edge portions.

14. A work counter assembly for an outdoor grill having a housing which encloses a cooking zone and includes an upstanding wall having a rim and a vertically extending outer surface, said work counter assembly comprising:

a work counter support member having a generally horizontal base portion connecting inner and outer U-shaped edge portions inwardly facing each other in opposed relation;

a work shelf member supported by said support member, said shelf member having a working surface for supporting food and the like and border portions on opposite sides of said working surface for being slidably received by the inwardly facing U-shaped edge portions of said support member; and, means for mounting said support member on the upstanding wall of said grill housing, each of said U-shaped edge portions comprising an inwardly extending lip segment for overlying a corresponding one of said border portions to prevent said shelf member from being separated from said support member in a generally vertical direction, and said mounting means comprising at least two spaced-apart bracket members each having a vertically extending elongated portion for resting adjacent to said outer surface of the upstanding housing wall, a horizontally extending elongated portion attached to said vertical portion for engaging said support member, and a triangular brace portion connecting a longitudinal extent of said vertically extending portion to a longitudinal extent of said horizontally extending portion.

15. A work counter assembly according to claim 14 wherein each of said brace portions is made of sheet metal and comprises a laterally projecting triangular protuberance to increase the strength of said brace portion for torsional and bending loads.

16. A work counter assembly according to claim 14 wherein each of said bracket members is formed of a single piece of sheet metal bent to form said elongated and said brace portions.

17. A work counter assembly according to claim 14 wherein said mounting means further comprises suspending means for extending over and engaging the rim of said upstanding wall to detachably suspend said vertically extending bracket portions from said rim.

18. A work counter assembly for an outdoor gill having a housing which encloses a cooking zone and includes an upstanding wall having a rim and a vertically extending outer surface, said work counter assembly comprising:

a work counter support member having a generally horizontal base portion connecting inner and outer U-shaped edge portions inwardly facing each other in opposed relation;

a work shelf member supported by said support member, said shelf member having a working surface for supporting food and the like and border portions on opposite sides of said working surface for being slidably received by the inwardly facing U-shaped edge portions of said support member; and, means for mounting said support member on the upstanding wall of said grill housing, each of said U-shaped edge portions comprising an inwardly extending lip segment for overlying a corresponding one of said border portions to prevent said shelf member from being separated from said support member in a generally vertical direction, said mounting means comprising at least two spaced-apart bracket members each having a vertically extending elongated portion for resting adjacent to said outer surface of the upstanding housing wall and a horizontally extending elongated portion attached to said vertically extending portion for engaging said support member, and said vertically extending portion of each of said bracket members having a substantially planar surface for extending opposite to the outer surface of said upstanding wall of the grill housing.

19. A work counter assembly according to claim 18 wherein each of said horizontally extending bracket portions has a substantially planar upper surface for engaging a bottom surface of the base portion of said work counter support member.

20. A work counter assembly according to claim 24 wherein said base portion is made of sheet metal, and wherein said support member further comprises an elongated stiffening member fixed to the bottom surface of said base portion, said stiffening member having a U-shaped transverse cross section and extending longitudinally substantially perpendicular to said inner and outer edge portions, and said elongated stiffening member being substantially centered between the horizontally extending portions of said bracket members.

21. A work counter assembly according to claim 18 wherein said vertically extending bracket portions are made of sheet metal and comprise a laterally projecting and longitudinally extending protuberance to increase the strength of said sheet metal for bending and torsional loads.

22. A work counter assembly according to claim 18 wherein each of said bracket members is formed of a single piece of sheet metal bent to form said vertically extending and said horizontally extending elongated portions.

23. A work counter assembly according to claim 22 wherein each of said bracket members further comprises a triangular brace portion connecting a longitudinal extent of said vertically extending portion to a longitudinal extent of said horizontally extending portion.

24. A work counter assembly according to claim 23 wherein each of said brace portions comprises a laterally projecting triangular protuberance to increase the strength of said brace portion for torsional and bending loads.

25. A work counter assembly for an outdoor grill having a housing which encloses a cooking zone and includes an upstanding wall having a rim and a vertically extending outer surface, said work counter assembly comprising:

a work counter support member having a generally horizontal plate portion made of sheet metal and connecting inner and outer U-shaped edge portions inwardly facing each other in opposed relation;

a work shelf member supported by said support member, said shelf member having a working surface for supporting food and the like and border portions on opposite sides of said working surface for being slidably received by the inwardly facing U-shaped edge portions of said support member; and, means for mounting said support member on the upstanding wall of said grill housing, each of said U-shaped edge portions comprising an inwardly extending lip segment for overlying a corresponding one of said border portions to prevent said shelf member from being separated from said support member in a generally vertical direction, said mounting means comprising at least two spaced-apart bracket members each having a vertically extending elongated portion for resting adjacent to said outer surface of the upstanding housing wall and a horizontally extending elongated portion attached to said vertical portion for engaging the plate portion of said support member, said support member further comprising a elongated stiffening member fixed to the bottom surface of said plate portion and having a U-shaped transverse cross section, and said elongated stiffening member extending longitudinally substantially parallel to and being substantially centered between the horizontally extending portions of said bracket members.

* * * * *

UNITED STATES PATENT AND TRADEMARK OFFICE
CERTIFICATE OF CORRECTION

PATENT NO. : 5,104,080
DATED : April 14, 1992
INVENTOR(S) : Bernard B. Berger It is certified that error appears in the above-identified patent and that said Letters Patent is hereby corrected as shown below:

Column 5, line 47, change "o" to --of--.

Column 8, line 39, change "a" to --an--

Column 7, line 25, change "24" to --18--.

Signed and Sealed this

Fifteenth Day of June, 1993

Attest:

MICHAEL K. KIRK

*Attesting Officer*     Acting Commissioner of Patents and Trademarks